Jan. 21, 1958     A. H. HABERSTUMP     2,820,494
POWER SCREWDRIVER
Filed July 19, 1955                                       7 Sheets-Sheet 1
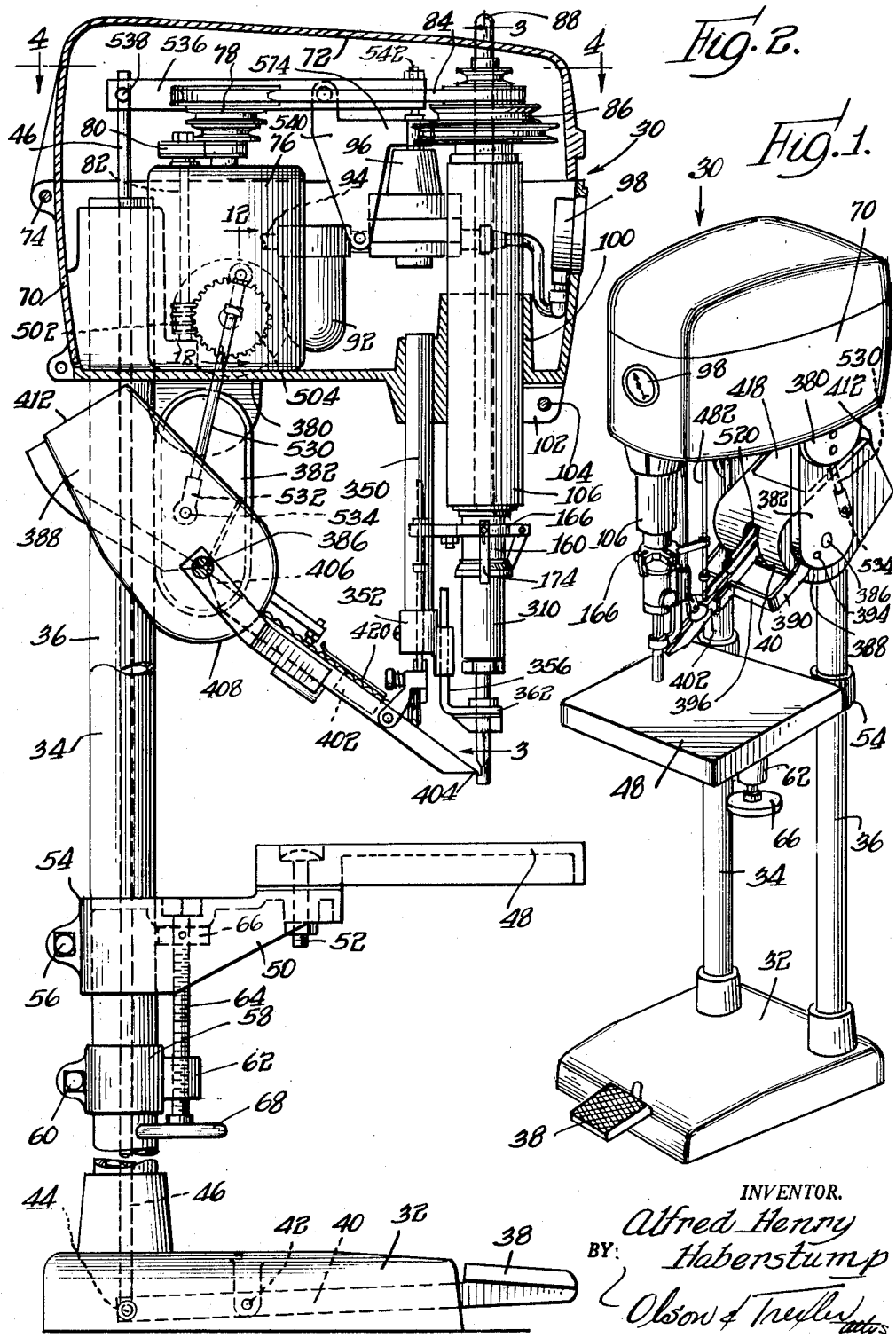
INVENTOR.
Alfred Henry
BY: Haberstump
Olson & Trexler

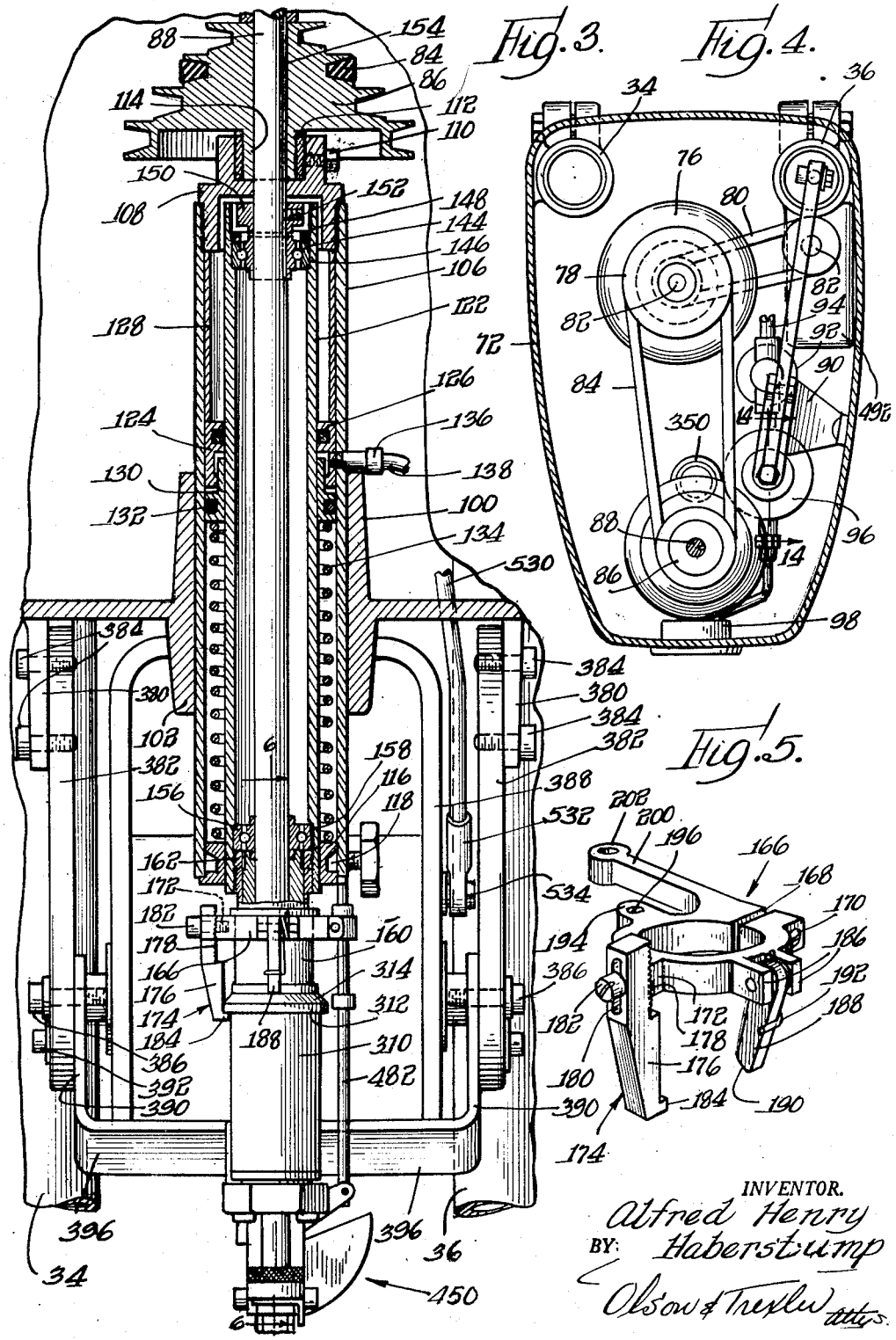

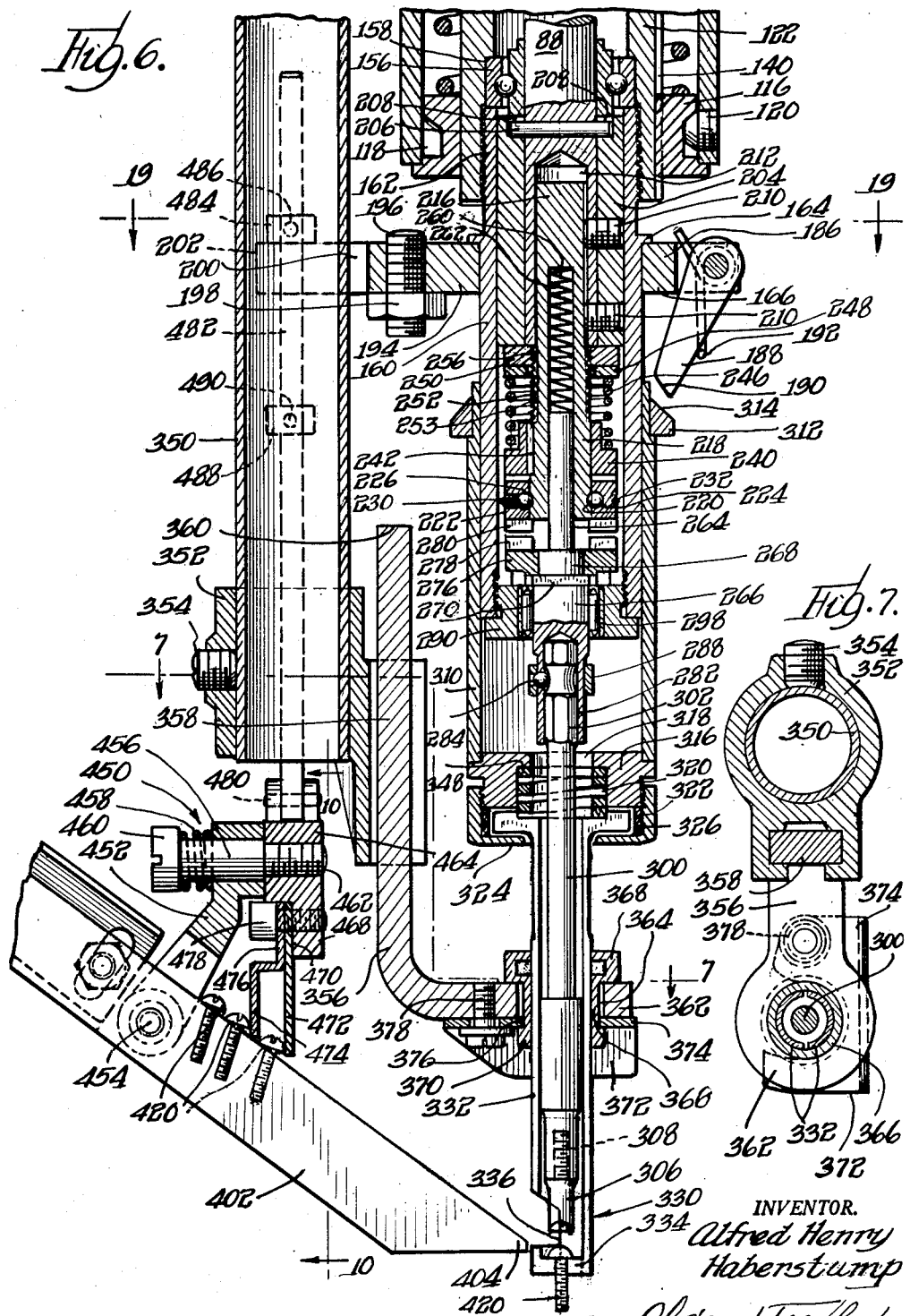

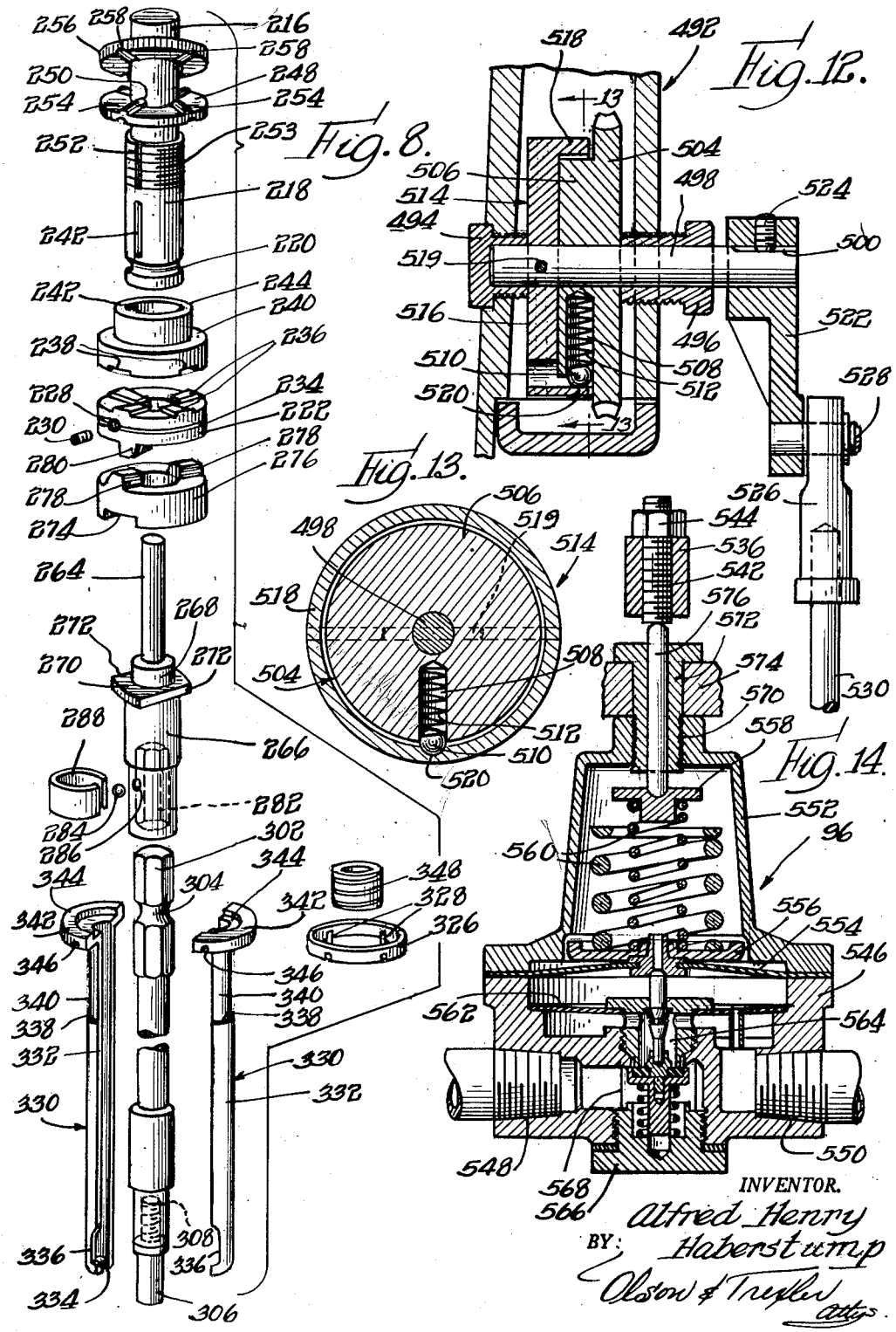

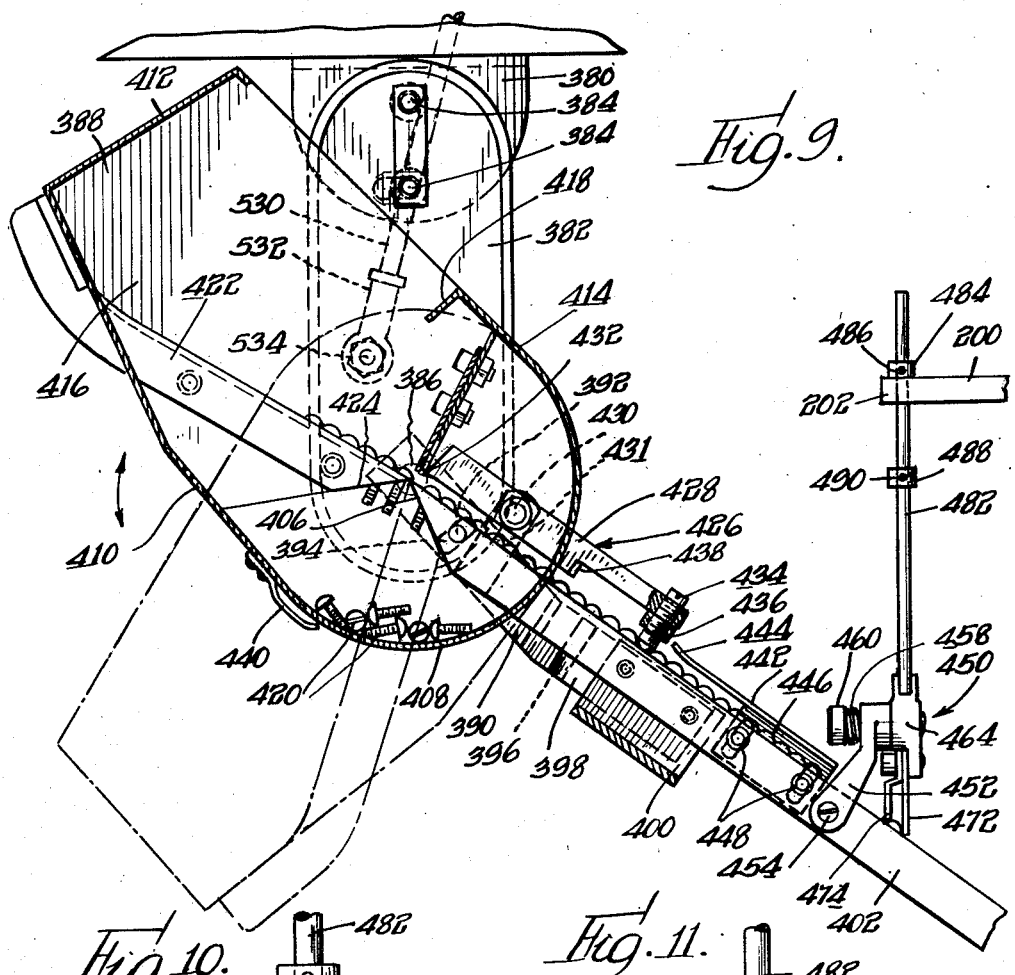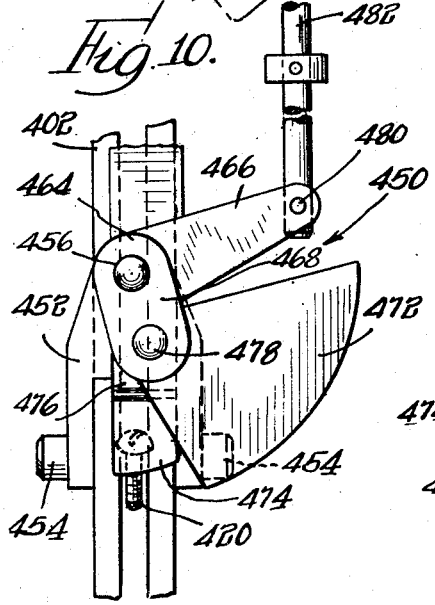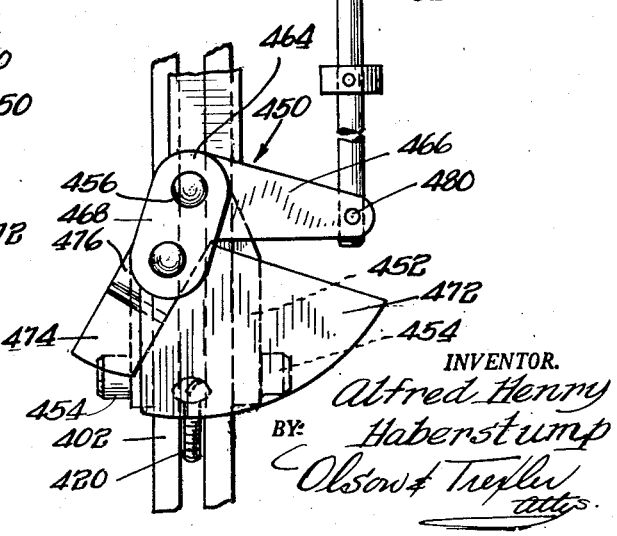

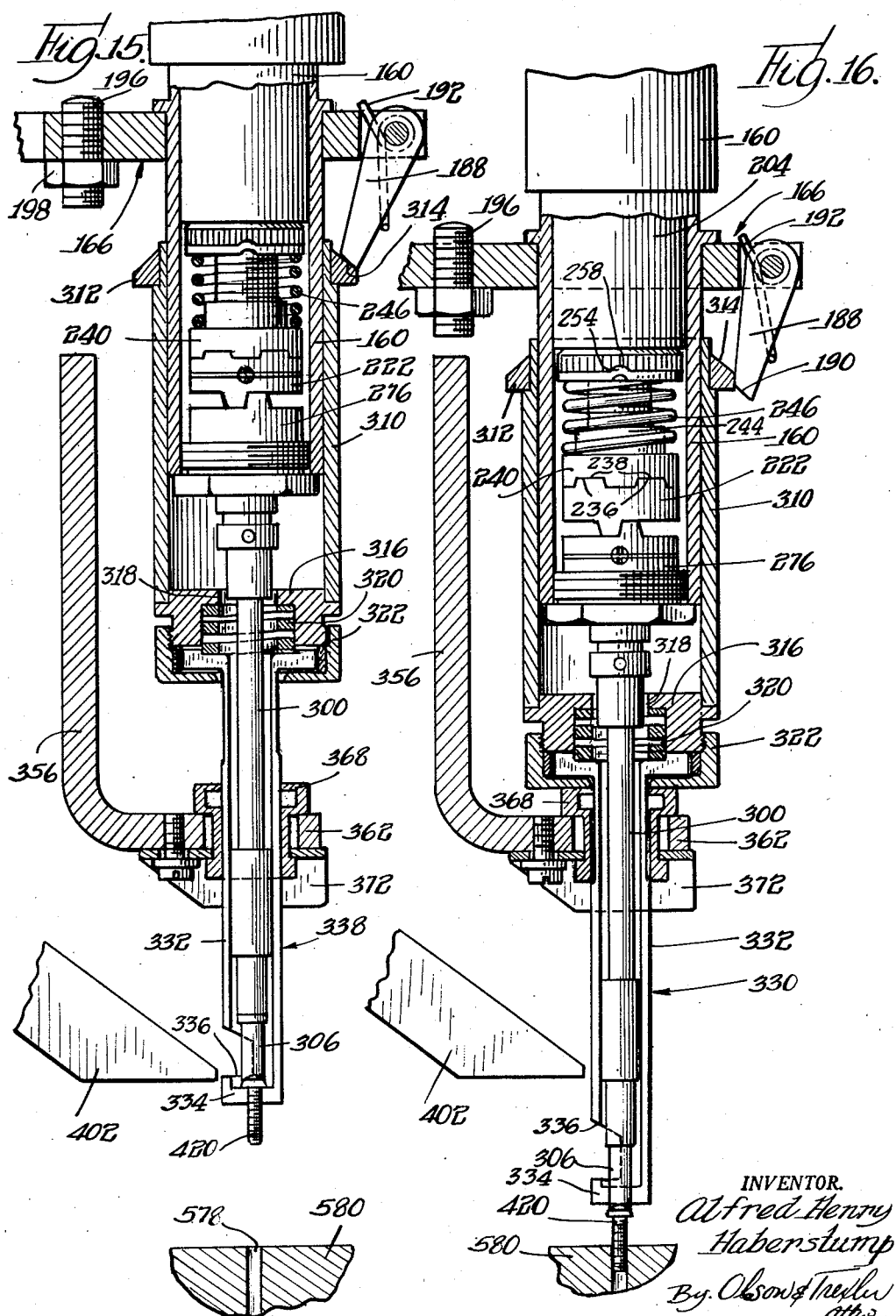

Jan. 21, 1958     A. H. HABERSTUMP     2,820,494
POWER SCREWDRIVER
Filed July 19, 1955     7 Sheets-Sheet 7
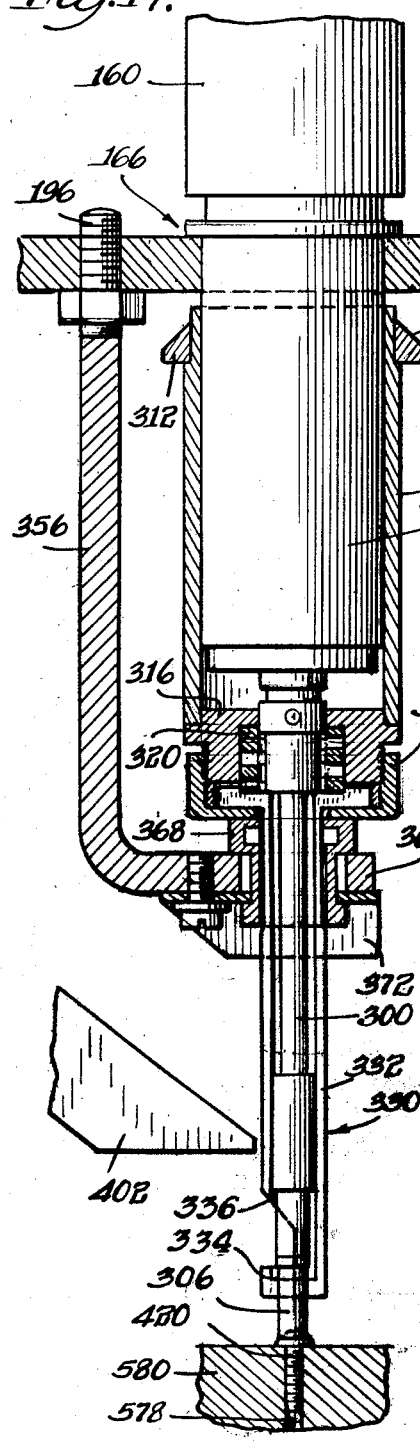
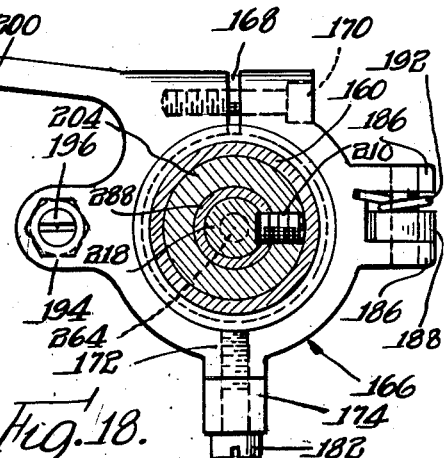
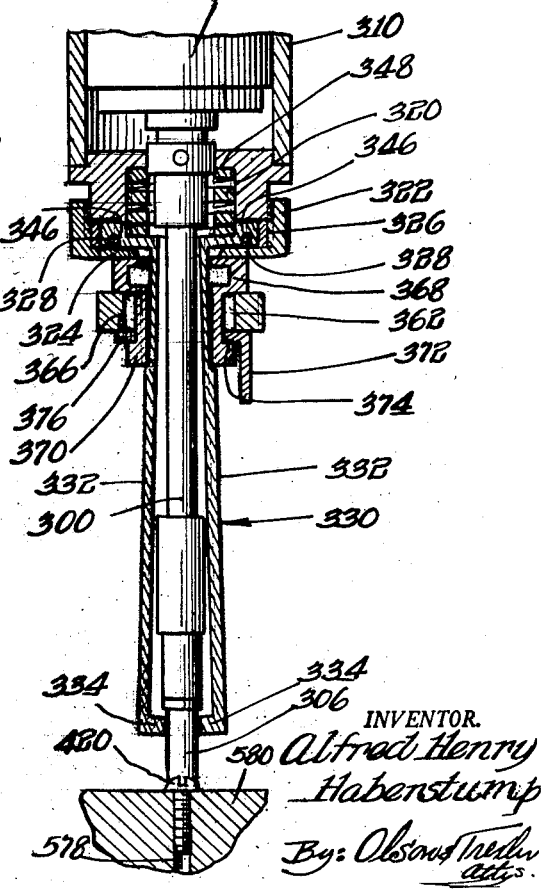
INVENTOR.
Alfred Henry Haberstump
By: Olson Trexler
attys

United States Patent Office 2,820,494
Patented Jan. 21, 1958

2,820,494

POWER SCREWDRIVER

Alfred Henry Haberstump, Detroit, Mich., assignor to Illinois Tool Works, Chicago, Ill., a corporation of Illinois Application July 19, 1955, Serial No. 523,042

21 Claims. (Cl. 144—32)

This invention relates generally to the art of fastener driving, and more particularly to a power operated power screw driver.

Various types of power screw drivers and other power drivers for driving screws and other fasteners into a succession of workpieces are well known in the art. The best of these have been efficient, rapid in operation, and rugged. However, they have not been absolutely perfect in some respects. The actuating mechanism often has been mounted to one side of the driver or driver housing, thereby requiring a link connecting to the vertically reciprocable part of the driver. As a result, the structure has been larger than necessary, and parts are in the open where they are susceptible to damage and the like, and where they may present some danger to the operator. Generally speaking, the screw catchers for holding the screws in driving position either have tended to mar the screws or the workpieces, or they have been relatively expensive and complicated. Furthermore, once the operator depresses the foot pedal to lower the driver, the driver descends as far as it is set to descend without any further control over it by the operator. Thus, it often is rather difficult to position workpieces for receipt of a screw when for one reason or another it has not been desirable or possible to mount the workpiece in a jig. It likewise generally has been difficult or impossible to adjust the extent of movement of the driver, and hence the depth to which a screw will be driven. Also, the mechanism for controlling movement of screws or other fasteners from a hopper or the like to a position in front of the driver has often been complicated or expensive to produce, has not operated properly, or has been positioned at some distance from the driver so that either parts must be critically timed in operation relative to one another, or the machine must be operated at a rather slow rate. Furthermore, certain parts of many machines have presented some hazard to the operator, either through failure to release when engaged by an operator's hand or the like, or through partial release as in a friction clutch, requiring constant pressure to hold a part against movement.

The invention hereinafter disclosed and described aims to obviate all of the foregoing difficulties.

It is an object of this invention to provide a power screw driver wherein the driver is pneumatically lowered by means within the housing.

More specifically, it is an object of this invention to provide a power screw driver wherein the quill acts as a piston within the housing as a cylinder for pneumatically lowering the drill.

Another object of this invention is to provide a power screw driver wherein controlled spring pressure is utilized for releasing the screw carrier from the lowering mechanism at a predetermined elevation.

Specifically, it is an object of this invention to provide a power screw driver wherein the screw carrier is lowered by driving means spring urged against a cam surface and camming over said surface when said carrier reaches a predetermined resistance to further lowering.

Yet another object of this invention is to provide a power screw driver wherein the downward movement of the spindle and associated parts is proportional to the movement of the foot treadle.

It is another object of this invention to provide an improved air valve in a power screw driver for effecting proportional movement between the treadle and the spindle and associated parts.

It is also an object of this invention to provide an escapement mechanism for feeding screws one by one to the carrier in driving position wherein the escapement mechanism is of simple and economical construction and is mounted adjacent the carrier.

It is further an object of this invention to provide an improved safety clutch drive for a screw hopper in a power screw driver completely to disconnect the driving mechanism of the hopper for a predetermined time when the hopper has a predetermined resistance to motion imposed on it.

It is another object of this invention to provide means for quickly and readily adjusting the depth to which screws can be driven by an automatic screw driver.

Other and further objects and advantages of the present invention will be apparent from the following description when taken in connection with the accompanying drawings wherein:

Fig. 1 is a perspective view of a power screw driver constructed in accordance with the principles of this invention;

Fig. 2 is a side elevational view partially in section;

Fig. 3 is a vertical cross sectional view taken substantially along the line 3—3 in Fig. 2;

Fig. 4 is a horizontal cross sectional view through the housing taken substantially along the line 4—4 in Fig. 2;

Fig. 5 is a perspective view of the screw carrier or catcher control collar;

Fig. 6 is a vertical sectional view taken substantially along the line 6—6 in Fig. 3;

Fig. 7 is a horizontal sectional view taken substantially along the line 7—7 in Fig. 6;

Fig. 8 is an exploded perspective view of the driver clutch subassembly and associated parts;

Fig. 9 is a vertical sectional view through the screw hopper;

Fig. 10 is a fragmentary front elevational view of the escapement mechanism as taken along the line 10—10 in Fig. 6;

Fig. 11 is a view similar to Fig. 10 showing the escapement mechanism in another position of operation;

Fig. 12 is a cross sectional view through the hopper clutch taken substantially along the line 12—12 in Fig. 2;

Fig. 13 is a sectional view at right angles to Fig. 12 taken substantially along the line 13—13 in Fig. 12;

Fig. 14 is a vertical sectional view through the air valve as taken substantially along the line 14—14 in Fig. 4;

Fig. 15 is a side view partially in section generally similar to Fig. 6 and showing the driver engaging a screw at the start of a driving operation;

Fig. 16 is a view similar to Fig. 15 and taken a few moments later with the parts in a different position;

Fig. 17 is a view similar to Figs. 15 and 16 and taken shortly after the view of Fig. 16 showing the parts in still another position of operation;

Fig. 18 is a view similar to the lower parts of Figs. 15–17 as the screw is driven to its final seated position; and Fig. 19 is a horizontal sectional view taken substantially along the line 19—19 in Fig. 6.

Referring now in greater particularity to the drawings, and first to Figs 1 and 2, there will be seen a power screw driver generally identified by the numeral 30 and including a base 32 having a pair of columns 34 and 36 upstanding from the rear corners thereof. The base is provided with a foot treadle 38 mounted on the end of an arm 40 which is pivotally carried by a bracket at 42 beneath the base. The arm 40 angles toward one of the columns, for example the column 36, and is pivotally connected at 44 to a connecting rod or actuating link 46.

The two columns 34 and 36 adjustably support a bench or work table 48 by means of a pair of arms 50 to which the table is connected by means such as nuts and bolts 52. The arms 50 are provided with split sleeves 54 allowing the arms to be tightly clamped on the columns by means of nuts and bolts 56 drawing up the sleeves, but permitting vertical adjustment of the table upon loosening of the nuts and bolts 56.

A fine adjustment as to the height of the table is provided by means of a split sleeve 58 mounted on one of the columns, for instance the column 34, and locked in place thereon by means of a nut and bolt 60. It will be understood that in the case of both the nuts and bolts 56 and 60 the bolts could be replaced by threaded studs having handles thereon, and the studs could be threaded into tapped apertures on one side of each of the split sleeves. The split sleeve 58 is provided with a laterally projecting lug 62 having a threaded aperture therethrough in which a threaded adjusting rod 64 is mounted. A collar 66 is pinned on the rod 64 near the upper end thereof and abuts a surface on the bottom of the arms 50, the rod projecting through suitable openings in the arms and having suitable retaining means on the upper end thereof. At the bottom of the threaded rod 64 there is provided a hand wheel 68. By way of example, the rod 64 can be a headed stud with the head positioned at the top, and the hand wheel 68 may be threaded and pinned onto the bottom of the bolt. It will be apparent that the split sleeve 58 can be locked on the corresponding column, and that the split sleeves 54 can be loosened so that the height of the table can be micrometrically adjusted by rotation of the hand wheel 68. Tightening of the nuts and bolts 56 to clamp the sleeves 54 on the columns serves to lock the table at the desired adjusted height.

Supported at the top of the columns 34 and 36 is a housing 70 having a cover or lid 72 hingedly connected thereto at 74. The housing mounts an electric motor 76 having a multiple pulley 78 on the output shaft thereof. The pulley 78 acts through a belt 80 to drive a pulley on the drive shaft 82 of the hopper drive mechanism hereinafter to be described. The pulley 78 also acts through a belt 84 to drive a multiple pulley 86 splined to the top of a spindle 88 as hereinafter will be brought out in greater particularity.

The housing 70 contains also a bracket 90 (Fig. 4) on which is mounted an air filter 92 having an inlet air line 94 connected thereto for supplying air under pressure. The air filter 92 is connected to a regulating valve 96 hereinafter to be described in detail. The valve is connected to an air pressure gauge 98 mounted in the housing, and also is connected to the screw driving mechanism as hereinafter will appear.

There is provided in the bottom of the housing 70 near the front thereof a boss 100 upstanding from the bottom wall of the housing and having a depending portion 102 in the form of a split sleeve or collar having a bolt or the like 104 therethrough. A spindle housing 106 is received in the boss and is clamped in place by the lower depending portion 102 of the boss 100. A cap 108 is threaded into the top of the housing 106 and is provided with an upstanding cylindrical portion through which a bolt 110 passes to lock the outer portion or race of a bearing 112. A downwardly projecting hub 114 of the spindle pulley 86 is rotatably received in the bearing and is held therein against longitudinal movement. The bearing may be of any type such as a sleeve bearing or a ball or roller bearing as will readily be understood.

At the bottom end of the spindle housing 106 there is provided a quill bearing 116. This bearing is provided with a circumferential groove 118, and a set screw 120 (Fig. 6) is threaded through the spindle housing and projects into the circumferential groove in the quill bearing to lock the bearing in place. A cylindrical tube forms a quill 122 journaled for vertical reciprocating movement in the quill bearing 116. An inner O ring seat 124 is fixed in the housing 106 slightly toward the upper end thereof, and this O ring seat serves to journal the upper portion of the quill in the housing. An inner O ring 126 is seated in the inner O ring seat 124 and bears against the outer surface of the quill to prevent air leakage between the quill and the housing. A tubular spacer 128 is mounted between the cap 108 and the inner O ring seat 124 to hold the inner O ring seat against upward movement. As will be apparent hereinafter, there are forces tending to move the inner O ring seat up, but none tending to move it down.

Partially within the inner O ring seat 124 there is provided an outer O ring seat 130 mounted on and fixed to the quill 122. The outer O ring seat 130 is provided with an outer O ring 132 bearing against the spindle housing 106 to prevent air leakage between the spindle housing and the outer O ring seat. A helical spring 134 is compressed between the outer O ring seat 130 and the quill bearing 116 normally to urge the quill upwardly relative to the housing. A pneumatic fitting 136 extends into the space between the inner and outer O ring seats and between the housing and the quill, and a high pressure air line 138 leading from the regulator valve 96 is connected to this fitting. Thus, when air under pressure passes to the space between the O rings and between the quill and the housing from the valve 96 under control of the treadle 38 the quill will be forced down. In this instance the quill and outer O ring seat act as a piston while the housing 106 acts as a cylinder. No external connectors or linkage of any sort thus is needed for lowering the driving mechanism. The structure accordingly is simplified, maintenance is substantially eliminated, and there are fewer external parts to cause possible injury to an operator or to get in the way during adjustment or maintenance of the apparatus. In Fig. 6 it will be observed that the quill 122 is provided with an elongated keyway 140 for keying to the quill bearing 116 to prevent rotation of the quill, but to allow vertical reciprocation thereof.

A rotary thrust spindle bearing 144 has the outer race thereof received in a recess or counterbore 146 at the upper end of the quill 122, and a spindle bearing retainer nut 148 is threaded into the upper end of the quill to retain the outer race of the bearing in proper position. A spindle collar 150 is fixed on the spindle immediately above the inner race of the bearing 144 by means such as a set screw 152. The bearing 144 helps to carry the spindle up and down with the quill while permitting rotation of the spindle relative to the quill as will be apparent, and in this connection it will be noted that the spindle is provided with an elongated keyway 154 by means of which it is keyed to the pulley for vertical movement relative thereto, but fixed for rotation with the pulley.

Toward the bottom of the spindle and the quill there is provided another rotary thrust spindle bearing 156 having its inner race mounted on the spindle and suitably secured thereto, and having its outer race fitting in a recess or counterbore 158 at the bottom of the quill. The upper end of a clutch housing 160 is threaded into the lower end of the quill as at 162 and bears against the bottom of the outer bearing race to secure the bearing race in seated position in the recess 158.

The outer surface of the clutch housing is provided at a short distance beneath the quill with an outer annular ring 164 (Fig. 6) and immediately beneath this ring there is affixed a catcher control collar 166. The catcher control collar (see Figs. 5, 6 and 19) is of split construction as is illustrated at 168. A bolt 170 extends across the split 168 and is threaded into the collar on one side thereof for clamping the collar tightly about the clutch housing. Substantially diametrically opposite to the split 168 the collar 166 is provided with a boss 172. To this boss is adjustably affixed a catcher lifter 174. The catcher lifter 174 includes a straight shank 176 having a recessed face 178. The face 178 is provided with transverse teeth or serrations for engaging the outer surface of the boss 172 free from slippage relative thereto. The upper portion of the shank 176 is provided with a vertical slot 180, and a bolt 182 extends through this slot and is threaded into the boss 172 to hold the catcher lifter in any desired position of adjustment. The catcher lifter further includes an inwardly directed finger 184 at the lower end of the shank, and the function of this finger will be brought out hereinafter.

Substantially at a 90° angular disposition relative to the split 168 and boss 172 the catcher control collar is provided with a pair of spaced apart, outstanding ears 186. Between these ears there is pivotally mounted a catcher control lever 188. The lever 188 is provided with an oblique lower edge 190, and a spring 192 encircling the pivot of the lever 188 urges the lever in toward the clutch housing. Substantially diametrically opposite to the ears 186 the catcher control collar is provided with an outstanding boss or projection 194. A stop 196 in the form of a threaded stud is threaded through this boss or projection, and a jam nut 198 threaded thereon and engaging the undersurface of the boss locks the stop in adjusted position.

An escapement control arm 200 extends tangentially from the catcher control collar adjacent the split 168 and in general parallelism with the boss or projection 194. The arm 200 is provided at its outer end with an eye or sleeve 202 for controlling the escapement mechanism hereinafter to be described.

At the lower end of the spindle 88 there is provided a sleeve 204 (Fig. 6) which is rotationally locked to the spindle by means of a cross pin 206 fitting through a diametrical bore in the spindle 88 and having its opposite ends received in recesses 208 at the top of the sleeve 204. A pair of set screws 210 extends through the sleeve 204 and through the outer portion of the lowermost spindle end, and these set screws further serve to lock the sleeve to the spindle. The spindle is provided with an axial bore 212 at its lower end, and the set screws 210 project into this bore as will be apparent.

The shank 216 of a spindle or stub shaft 218 is received in the axial bore 212. The spindle or stub shaft 218 as may be seen in Figs. 6 and 8 is provided near its lower end with a circumferential groove 220. A driving clutch member 222 fits over the lower end of the spindle or stub shaft 218 and is provided with an inner circumferential groove 224 confronting the groove 220. A plurality of balls 226 is introduced one by one to the confronting grooves through a radial bore 228 in the driving clutch member. After all of the balls 226 have been inserted the bore 228 is closed by a set screw 230, and a split spring wire 232 is received in an outer circumferential groove 234 of the driving clutch member and fits in the driving slot of the set screw 230 to preclude accidental withdrawal thereof. The balls 226 prevent axial movement of the driving clutch member 222 relative to the spindle or stub shaft 218 as will be apparent, but permit relative rotational movement thereof.

The driving clutch member 222 (see Fig. 8) is provided on its upper face with a plurality of upwardly projecting, arcuately spaced teeth 236. These teeth are received in complementary slots or grooves 238 in the lower face of a clutch member 240. The clutch member 240 encircles the spindle or stub shaft 218 and is keyed thereto at 242. The clutch member 240 is provided with an upper reduced diameter portion 244, and a coil spring 246 encircling this portion and bearing against the lower portion normally holds the clutch member 240 down against the driving clutch member 222. However, if a predetermined resistance to torque is encountered by the driving bit hereinafter to be referred to, the teeth 236, having slightly beveled radial edges, cam the clutch member 240 up against the force of the spring 246 to prevent damage.

The spring 246 is seated at its upper end against a retaining ring or washer 248. This retaining ring or washer is provided with a radially inwardly extending tang 250 received in a slot 252 in the spindle or stub shaft, the spindle or stub shaft being threaded at 253 in the area of the slot. The retaining ring or washer 248 thereby is locked to the spindle or stub shaft for rotation therewith.

The retaining ring or washer further is provided with upwardly struck radial projections 254. There are four such projections equally arcuately spaced about the retaining ring or washer in the illustrative example. A ring nut 256 is threaded onto the threads 253 of the spindle or stub shaft above the retaining ring or washer, and is provided with radial grooves 258 on its undersurface which are complementary to the upward projections 254 of the retaining ring or washer 248. It will be apparent that the pressure on the spring 246 can be set to only desired value by forcing the retaining ring or washer down and rotating the ring nut to the proper position. Spring pressure of the retaining ring or washer against the ring nut will cause the projections 254 to seat firmly in the grooves 258 to lock the ring nut against accidental rotation on the spindle or stub shaft which would change the spring pressure.

The spindle or stub shaft 218 is provided with an axial bore 260 extending upwardly from its lower end. A coil spring 262 is received in this bore and bears against the end of the shank 264 of a chuck or collet 266. The chuck 266 is provided immediately below the shank 264 with a portion 268 of intermediate diameter. Immediately below this portion there is provided a flange 270 having flats 272 on opposite sides. This flange is received in a complementary slot or groove 274 in the underface of a driven clutch member 276. The clutch member 276 is mounted about the portion 268 and is provided on its upper face with upwardly projecting, bevelled teeth 278, engageable with similar teeth 280 on the underside of the driving clutch member 222. The spring 262 normally urges the chuck or collet down so that the teeth 278 and 280 are not in engagement. However, upon a predetermined upward movement of the chuck or collet the teeth 278 and 280 engage, and the chuck or collet 266 thereby is driven.

The chuck or collet is provided in its lower end with a non-circular bit receiving socket 282. A ball retainer 284 is held in a suitable aperture 286 in the chuck or collet and is urged inwardly to project into the socket 282 by means of a split spring retaining ring 288.

A clutch needle bearing and retainer subassembly 290 is threaded into the lower end of the clutch housing 160 and includes needle bearings 298 rotatably journalling the chuck or collet 266. This subassembly limits downward movement of the chuck or collet as will be appreciated.

A driving bit 300 has a non-circular shank portion 302 received in the socket 282. A circumferential groove 304 receives the spring-pressed ball retainer detachably to hold the bit 300 in the chuck or collet. A driving tip 306 preferably is threaded as at 308 into the lower end of the driver bit. Although this tip may be of any desired shape, and is readily replaceable by virtue of the screw thread connection, it is herein shown as having a downwardly facing recess provided with a straight blade, and generally being complementary to a round head screw.

A clutch housing sleeve 310 is mounted about the clutch housing 160 for vertical movement relative thereto. A catcher control ring 312 is seated about a reduced diameter portion of the sleeve 310 at the upper end thereof, and is secured thereto by any suitable means such as welding. The under side of the catcher control ring forms a right angle with the sleeve 310, while the upper surface thereof is a beveled cam surface as is illustrated at 314.

A plug 316 fits in the lower end of the sleeve 310 and is welded or otherwise suitably secured therein. The plug is provided with an axial bore 318, and with a counterbore forming a spring seat 320. A catcher nut 322 is threaded on the lower end of the plug 316 and has a radially inwardly extending flange 324. A retainer ring 326 is seated in the nut 322 and is provided with a pair of spaced apart, parallel cross pins 328 as readily may be seen in Figs. 8 and 18.

A catcher 330 comprising a pair of jaws 332 of mirror image construction is held by the nut 322. The arms or jaws 332 are provided at their lower ends with inwardly directed retaining fingers 334 and are cut out thereabove as at 336 to permit transverse shifting of a screw into the catcher jaws from a slide chute. The catcher jaws or arms are relatively thick for the major portion of their length from the bottom up and are provided relatively near the top thereof with shoulders 338 and a portion 340 of reduced diameter.

The catcher jaws or arms 332 are provided at their upper ends with a pair of semicircular plates 342 co-acting to form a circular head. The plates are provided with central semicircular recesses 344 forming a spring seat as hereinafter will be made more apparent. Chordal recesses 346 are provided on the undersides of the semicircular plates 342 to receive the pins 328. A coil spring 348 surrounds the shank of the bit 300 and is compressed within the seat 320 and against the semicircular recesses 344 so as normally to tend to pivot the jaws or arms 332 of the catcher 330 away from one another about the pins 328.

A support tube or column 350 (Figs. 2, 6 and 7) extends downwardly from the housing 70 parallel to the spindle housing 106 and has a collar 352 secured on the lower end thereof by means such as a set screw 354. A generally L-shaped catcher control arm 356 has its shank affixed to a depending channel portion of the sleeve or collar 352 as at 358 by any suitable means (not shown) such as clamp screws. The upper end of the shank extends above the sleeve or collar 352 to form a limit stop 360.

The lower portion of the L-shaped catcher arm 356 is provided with an integral sleeve or cylinder 362 having a vertical bore 364 therethrough. A bushing 366 is received in the hole or bore 364 and has a relatively large circumferential flange 368 at its upper end resting on top of the sleeve or cylinder 362. The bushing 366 also is provided at its lower end with a circumferential flange 370. The flange 370 is of sufficiently small diameter to fit through the bore 364. A retainer bracket 372 of angular construction is provided with a horizontal flange 374 having a side opening 376 fitting about the bushing 366 above the flange 370 to secure the bushing in the sleeve or cylinder 362. A screw 378 passing through the horizontal flange 374 and threaded into the horizontal portion of the catcher control arm 356 secures the angle bracket 372 to the underside of the catcher control arm. The bushing 366 surrounds the catcher jaws or arms 332 and holds them in closed position when the jaws are in the raised position shown in Fig. 6.

A pair of ears 380 (Figs. 1-3 and 9) depends from the bottom of the housing 70 near the rear thereof and positioned adjacent the opposite sides of the housing. A pair of brackets 382 extends downwardly from the ears 380, being secured thereto by two pairs of screws 384, the lowermost screw of each pair fitting through an arcuate slot in the associated ear for angular adjustment of the brackets 382. A pair of studs 386 extends inwardly through each of the brackets 382 near the lower end thereof and pivotally mounts a screw hopper 388, the construction of which will be referred to in greater particularity shortly hereinafter. The studs or stub shafts 386 before reaching the hopper pass through the upper ends of a pair of L-shaped brackets 390. The L-shaped brackets 390 also are held to the bracket 382 by screws or bolts 392, fitting through arcuate slots 394 in the brackets 382 for pivotal adjustment of the L-shaped brackets 390 about the studs or stub shafts 386.

The lower arms 396 of the L-shaped brackets extend inwardly toward one another and terminate in spaced relation, having a pair of brackets 398 mounted on the ends and extending in parallelism with one another and with the upper portions of the L-shaped brackets 390. A U-shaped bracket 400 is secured to the brackets 394, and the bracket 400 mounts a screw feed track 402. This track is of generally conventional construction comprising a pair of spaced apart rails on which the heads of screws are to ride with the shanks thereof depending between the rails. The track tapers to a point 404 at the lower end adjacent the catcher 330, and tapers to a similar point 406 at the upper end at the axis of the hopper as determined by the studs or stub shafts 386.

The shape of the hopper 388 is shown in the drawings and comprises a rounded lower end 408, a bottom wall 410 extending rearwardly and upwardly therefrom, a flat upper end 412, and a rearwardly projecting top wall 414. The hopper further includes a pair of side walls 416. The hopper is open at 418 between the top wall 414 and the upper end 412 for dumping loose screws 420 into the hopper. The hopper also is provided with a slot or cutout 421 extending completely around the rounded lower end 408 of the hopper for providing clearance for the track 402 as the hopper rocks up and down about the axis 386 in a manner shortly to be described.

The slot 421 is provided with inner lining walls so that screws cannot fall out of the hopper through the slot. The hopper further includes a stub track 422 having a pointed lower end 424 terminating adjacent the pointed end 406 of the track 402. The hopper rocks from the solid line position shown in Figs. 1, 2 and 9 to the broken line position of Fig. 9, and in returning to the solid line position screws are picked up in the stub track 422 as will be seen in Fig. 9. These screws tend to slide into the track 402 as will be apparent.

Screws from the stub track 422 are prevented from entering the track 402 when the track 402 is full. This is done by an arresting mechanism 426 (Fig. 9). The arresting mechanism comprises a bar 428 pivotally mounted at 430 on a bracket 431 attached to the upper end of the track 402. The upper end of the bar 428 is provided with a depending detent 432 which is capable of a sufficiently close approach to the upper end of the track to prevent entrance of screws into the track. The opposite end of the bar is provided with a stop screw 434 having a lock nut 436 thereon. The stop screw is provided with a rounded lower end adapted to ride on the tops of the heads of screws 420 when there are screws in the track. When the set screw does ride on the top of such screws, the bar is pivoted to such position that the detent 432 approaches the track sufficiently closely to prevent entrance of screws into the track. However, when there is an absence of screws in the track as shown in Fig. 9, the set screw abuts the top surface of the track, the end of the bar bearing the set screw being heavier than the opposite end, and the detent 432 is raised sufficiently far above the top surface of the track to allow entrance of screws thereinto.

It will be apparent that the set screw 434 when resting on the top surface of the track might prevent passage of screws past it. To provide against this contingency, there is a transversely directed finger 438 on the bar 428. This bar cooperates with means including a spring member 440 on the rear wall 410 of the hopper 388. Thus, each time the hopper pivots to the broken line position of Fig. 9, the spring member 440 engages the finger 438 to pivot the bar 428 in a counterclockwise direction. This raises the set screw 434 from the top surface of the track, allowing the screw heads to pass beneath the set screw.

A hold-down flange 442 including an upturned finger 444 is formed integral with a plate 446 adjustably mounted by bolts 448 on the track 402 downstream from the mechanism 426 to prevent heads of screws from piling up on one another with consequent improper feeding.

The track 402 is provided below the flange 442 with an escapement mechanism 450 illustrated in Figs. 6 and 9–11 in considerable detail. The escapement mechanism includes a bracket 452 mounted on the track 402 by means of a pair of bolts 454. A stud or bolt 456 extends rotatably through the upper portion of the bracket 452, having a spring 458 compressed between the bracket and the stud or bolt head 460. The stud or bolt 456 is provided with a reduced, threaded end 462, and the reduced threaded end is tightly threaded into a bell crank 464 having a long arm 466 and a short arm 468.

The rear face of the short arm 468 is relieved as at 470, and a more or less fan-shaped release plate 472 is mounted in the relieved area. A retaining plate 474 having an offset attaching end 476 also is mounted in the recess or relieved area. The offset provides a spacing between the plates 472 and 474 substantially equal to the width of a screw head. Both the plate 472 and the offset mounting area 476 of the plate 474 are held against the short arm 468 of the bell crank by a screw or bolt 478. The restraining plate 474 is of rather narrow width, as will be apparent particularly in Figs. 10 and 11.

The long arm 466 of the bell crank is bifurcated at its outer end, and a pivot pin 480 therein pivotally connects to a control rod 482. The control rod projects straight up through the eye 202 at the end of the generally tangential arm 200 of the catcher control collar 166. A stop 484 is adjustably secured on the control rod 482 by means such as a set screw 486, the stop being positioned above the eye 202, and a similar stop 488 is adjustably positioned on the control rod below the eye, being spaced from the first stop 484 a substantial distance, and being adjustably secured in position by means such as a set screw 490.

The above described sorting hopper and delivering device forms no part of the present invention, as it is illustrated, described and claimed in the copending application to A. H. Haberstump, Serial No. 325,943, filed December 15, 1952.

With the power screwdriver in quiescent position, the catcher control collar 166 is in the raised position shown in Fig. 6. This holds the control rod 482 in the raised position shown in Figs. 6, 9 and 10 by virtue of the escapement control arm 200 engaging beneath the stop 484. The spring 458 on the escapement mechanism further tends to hold the parts in this position, and in this position the restraining plate 474 lies across the top of the track 402 in the position shown in Figs. 6, 9 and 10 to prevent any screws from being fed gravitationally down the track. When the driving mechanism is lowered as hereinafter will be described, the catcher control collar is lowered. The arm 200 thus abuts the stop 488 and lowers the control rod 482. This pivots the escapement mechanism to the position shown in Fig. 11, the restraining plate being moved out of the path of screws in the track, and the release plate being moved into blocking position across the track. The line of screws in the track thus advances one screwhead width down the track. When the mechanism subsequently raises the arm 200 engages beneath the stop 484 and pivots the release mechanism back to the position shown in Fig. 10 to reelase the leading screw, the restraining plate blocking the remainder of the line of screws. The lost motion connection effected by the spacing of the stops 484 and 488 allows the operation of the mechanism to be timed properly with the raising and lowering of the driving mechanism.

A hopper clutch housing 492 (Figs. 4 and 12) is secured within the housing 72, and a thimble 494 and a bushing 496 threaded into aligned openings in the sides thereof provide bearings for a hopper drive shaft 498 having a flat 500 on its outer end. A worm 502 (Fig. 2) on the shaft 82 is driven within the housing 492 and drivingly engages a wormwheel 504. This wormwheel is provided with an axially extending hub 506 having a radial bore 508 therein. A ball 510 in the outer end of the bore is pressed outwardly by a spring 512 seated in the bore. The wormwheel 504 is mounted for free rotation on the shaft 498, and a driving clutch member 514 having a disk portion 516 and an axially extending cylindrical flange 518 is pinned on the shaft 498 by a pin 519. The inner surface of the peripheral flange 518 is provided with a recess or ball seat 520 best seen in Fig. 13. The spring 512 normally presses the ball 510 into the seat 520 so that the clutch member 514 rotates with the wormwheel 504.

A crank shaft 522 is mounted on the outer end of the drive shaft 498 and is fixed thereto by means of a set screw 524 bearing against the flat 500. A connector 526 is pivotally connected at 528 to the end of the crank 522, and is secured to the upper end of a connecting rod 530. The connecting rod 530 in turn is provided at its lower end with a connector 532 which is pivotally connected at 534 (Figs. 1, 2 and 9) to the side of the hopper for rocking the hopper up and down as the gear 504 rotates.

It previously has been noted that the foot treadle is pivotally connected to a connecting or actuating rod 46 extending up through the supporting column 36. At the top end the connecting or actuating rod is connected to a regulator lever 536 (Figs. 2 and 14) at 538, the lever being pivotally mounted on a bracket 540 within the housing 70. A stop 542 is threaded through the opposite end of the lever in vertical position and is provided with a locking nut 544. The stop 542 is positioned immediately above the air regulator valve 96.

The regulating valve 96 is mainly of conventional construction, and description thereof need not be amplified. The main part of the valve is of the type made by the C. A. Norgren Company, Englewood, Colorado, and includes a valve body 546 having inlet and outlet openings 548 and 550. The valve further includes a bonnet 552. A diaphragm 554 is mounted between the bonnet and valve body in accordance with the usual practice. A lower spring rest 556 is positioned on top of the diaphragm, and an upper spring rest 558 is positioned toward the top of the bonnet, a pair of springs 560 being compressed between the spring rests.

Beneath the diaphragm 554 and within the valve body there is the usual baffle plate assembly 562 and valve pin assembly 564, both of generally conventional construction. A valve guide plug 556 is provided in the bottom of the valve body, and the usual strainer screen 568 surrounds the valve pin assembly.

The novel and inventive difference represented over the conventional construction is found at the top of the regulating valve. The upper portion of the bonnet is provided with a threaded axial opening 570 through which an adjusting screw normally is threaded. The adjusting screw is turned up and down to open or close the valve. In the present construction, the regulating screw has been eliminated. Instead, an externally threaded bushing 572 is threaded into the bore 570. The bushing also is passed through an arm 574 of the bracket 540 before threading into the bore 570 in order firmly to support the upper portion of the regulator valve. A regulating pin 576 is slidably received in the bushing 572 and bears at its lower end against the upper spring rest, the upper end being borne against by the stop 542. Whenever the foot treadle is depressed, the actuating or connecting rod or link pivots the lever 536, and thereby acts through the stop 542 to depress the pin 576, and hence to vary the pressure on the diaphrgam, thereby varying the position of the valve pin. Accordingly, the pressure of the outlet air from the regulator varies in accordance with the distance the foot treadle is depressed. Thus, the driving mechanism can be lowered to any desired degree and held in partially lowered position for any desirable purpose, such as critically positioning a workpiece which is not held in a jig.

Operation of the screwdriver hereinbefore described will be most readily understood with reference to Figs. 6, and 15–18. Operation of the escapement mechanism on the screw feeding track previously has been described, and it will be observed in Fig. 6 that one screw 420 has descended through the track 402 into the space between the jaws 332 of the catcher 330. The catcher jaws are held together by the bushing 368 fitting about the thicker portion of the catcher jaws. When the treadle 38 is depressed by the operator's foot, air is admitted to the space between the inner and outer O ring seats 124 and 130 and between the quill 122 and housing 106. The quill thus is forced down, as is the spindle 88, the spindle constantly being driven by the pulley 86 through the axially movable spline or keyed connection. The connection of the clutch housing to the quill causes the clutch housing simultaneously to be lowered. The clutch housing sleeve 310 at first is not lowered, and hence the catcher control lever 188 engages the ring 312, the cam tip 190 of the lever engaging the cam surface 314 of the ring as is shown in Fig. 15. Further lowering of the clutch housing in the manner described also brings the tip 306 of the driver 300 into driving engagement with the screw 420. This causes the driver to resist further lowering until such time as the lever 188 has engaged the ring 312, and consequently the chuck or collar 266 moves up against the force of the spring 262 to cause the clutch parts 222 and 276 to engage, thereby starting the driver 300 in rotation.

As the mechanism continues to lower through the force of air under pressure within the space between the O ring seats 124 and 130 and between the quill 122 and housing 106, and through the lever 188 acting on the ring 312, the screw 420 is started into an aperture 578 in a workpiece 580. After the screw has been partially threaded into this aperture, the nut 322 engages the bushing 368 as is shown in Fig. 16, and the clutch housing sleeve 310 can go no lower. The cam tip 190 of the lever 188 thus cams off of the cam surface 314 of the ring 312 against the force of the spring 192, the force of this spring thus being overcome. Although the bushing 368 provides a positive stop for the nut 322, it will be apparent that only a predetermined resistance to downward movement of the sleeve 310 must be imposed to cause the lever 188 to cam off of the surface 314 of the ring 312. In short, some stop other than a positive stop could be utilized.

Once the nut 322 has engaged the bushing 368, the clutch housing sleeve can descend no further. The clutch housing and the driver 300, however, continue to descend. It will be observed in Fig. 16, recently referred to, that the thick portion of the catcher 330 has passed below the bushing 368. The thinner portion thus expands out into the bushing and the jaws 332 move apart whereby the tip 306 of the driver 300 may pass down below the lowermost extremity of the jaws, the screw being released by the jaws of the catcher and carried down with the driver. Eventually, the screw reaches the fully seated position shown in Figs. 17 and 18. If the operator does not release pressure on the foot treadle at this time, the clutch member 240 will move up against the force of its spring 246, camming the clutch parts 240 and 222 apart so that no damage is done to the apparatus, to the screw, or to the workpiece. When pressure on the treadle is removed, the spring 134 serves to raise the quill and the clutch housing including the collar 166. The lifter 174 has its finger 184 positioned beneath the ring 312 as readily may be seen in Fig. 3, and the lifter accordingly raises the clutch housing sleeve and the catcher to the position shown in Fig. 6.

It will be understood that during such driving of a screw the escapement mechanism 450 will have been operated to release a screw from behind the restraining plate through the dashed line position shown in Fig. 6 behind the release plate for subsequent passage down through the bottom portion of the track 402 into the catcher in the position shown.

It will be understood that during the operation of the machine a supply of screws is maintained in the track 402 by rocking of the hopper 388. The constant rocking motion of the hopper and the movement of the connecting rod present no danger to the operator for any rather substantial resistance to motion of the hopper or connecting rod causes the ball 510 of the hopper clutch to move out of the ball seat 520. The wormwheel 504 thus rotates freely through one complete revolution without imposing any strain on the operator or other agency restraining the hopper. After one complete revolution of the wheel 504, the ball 510 again enters the seat 520, and if the resistance to movement of the hopper and connecting rod has ceased, the movement of the hopper again will start. However, if the resistance still is there, the ball 510 merely will roll through the seat 520 with a small driving impetus being applied to the connecting rod and hopper.

From the foregoing description it will be observed that the power screwdriver herein shown and described possesses many advantages unique in its field. The use of the quill as a piston within the housing as a cylinder to lower the driving parts of the apparatus brings about a compact and efficiently operating apparatus which has no unnecessary outwardly projecting parts to present hazard to the operator or to get in the way of maintenance men. The proportional movement between the foot treadle and the driving mechanism as effected by the improved regulator is important in allowing fine control over the machine, and particularly for effecting precise positioning of a workpiece relative to the driven screw.

The catcher control collar provides an efficient and inexpensive control means for regulating the raising and lowering of the driving mechanism and for operating the escapement mechanism for feeding screws to driving position. In this connection, it will be realized that the spring biasing the catcher control lever carried by the collar can be changed to vary the force which must be overcome to stop the lowering of the catcher jaws while allowing the driver to continue to move downwardly. The escapement mechanism actuated by the collar is of simple and rugged construction and is positioned relatively close to the catcher so as to effect a substantially direct control on the screws passing into the catcher.

It has been noted heretofore that when a screw has been fully driven, a clutch in the apparatus will open to prevent damage to the screw and workpiece, and to the apparatus. It is not possible for the clutch housing to be urged down to hold the clutch parts forcibly against one another with the downward movement of the driver limited by the workpiece inasmuch as the adjustable stop 196 carried by the catcher control collar engages the stop 360 at the top of the L-shaped arm 356 as shown in Fig. 17 to limit downward movement of the clutch housing. The depth to which screws can be driven thus readily can be adjusted by loosening the lock nut 198, threading the screw threaded stop 196 up or down, and thereafter tightening the nut 198.

The clutch for the hopper drive is of simple and inexpensive construction, and is far superior to a friction clutch in that a friction clutch always imposes a driving force on the driven part, whereas the hopper clutch herein shown and described releases completely. It is to be understood that the apparatus herein shown and described is not limited to driving screws, or even to driving rotary fasteners. For example, nails could be driven by replacing the screw driving tip with a blunt tip. In this case, there would be no need for rotating the driver.

The specific embodiment of the invention herein shown and described is to be understood as being for illustrative purposes. Various changes in structure will no doubt occur to those skilled in the art, and are to be understood as forming a part of the invention insofar as they fall within the spirit and scope of the appended claims.

I claim:

1. A power screwdriver comprising a housing, a quill mounted in said housing for reciprocatory movement relative to said housing, a drive shaft rotatably mounted in said quill and fixed for axial reciprocatory movement therewith, said drive shaft having driven and driving ends extending from opposite ends of said quill, means at one end of said housing for rotating said drive shaft relative to said housing, means on said quill forming a moving seal with said housing, means fixed relative to said housing and forming a moving seal with said quill, said seals, said housing, and said quill forming a chamber, and means for introducing fluid under pressure into said chamber to move said drive means axially in the direction of the driving end of the drive shaft relative to said housing to drive a screw or the like.

2. A power screwdriver comprising a housing, a tube mounted in said housing for axial movement relative to said housing, rotary driver means mounted in said tube for axial movement therewith and for rotation relative to said housing, said driver means having driven and driving ends extending from opposite ends of said tube, at one end of said housing means for rotatably driving said driver means relative to said housing, means fixed to said tube and forming a movable seal to said housing, means fixed to said housing and forming a movable seal with said tube, said housing, said tube, and both of said seal means forming an expansion chamber, and means for introducing fluid under pressure into said chamber for urging said seal means in opposite directions, whereby to move said tube and said driver means axially relative to said housing in the direction of the driving end of said driver means in order to drive a screw or the like.

3. A power screwdriver comprising a housing, a tube mounted in said housing for axial movement, rotary driver means mounted in said tube for axial movement therewith and for rotation relative to said housing, said driver means having a driven end adjacent one end of said tube and a driving end extending from the other end of said tube, means adjacent said tube and engaging said driver means near the driven end thereof for rotating said driver means, means fixed to said tube and extending radially outwardly therefrom and circumferentially around the tube forming a moving seal with said housing, means fixed to said housing and circumferentially extending around said tube and forming a moving seal therewith, said last named seal means extending inwardly from said housing generally radially of said tube, said housing, said tube, and both of said seal means forming a substantially closed chamber, and means for introducing fluid under pressure into said chamber for urging said seal means in opposite directions whereby to move said tube and said driver means axially in the direction of the driving end of said driver means relative to said housing in order to drive a screw or the like.

4. A power fastener driver comprising a housing, drive means mounted in said housing for reciprocatory movement relative to said housing and extending out of said housing in axially opposite directions, means fixed for reciprocatory movement with said drive means and forming a moving seal with said housing, means fixed relative to said housing and forming a moving seal with said drive means, said seals, said housing, and said drive means forming a substantially closed chamber, and means for introducing fluid under pressure into said chamber to move said drive means axially relative to said housing to drive a fastener.

5. Fastener driving apparatus comprising a fastener driving member operable between a retracted and an advanced position, means for supporting a fastener in alignment with said driver member and spaced therefrom with said driver member in retracted position, means for supplying fasteners to said fastener supporting means, means for advancing said driver member relative to said supporting means to bring said driver member into engagement with a fastener carried by said supporting means, means for thereafter coupling said driver member and said supporting means for advancing said driver member and said supporting means as a unit, said coupling means releasing upon application of a predetermined arresting force to said supporting means, means for applying a predetermined arresting force to said supporting means, said coupling means thereby releasing, and means for further advancing said driver member beyond said supporting means to drive said fastener into a workpiece.

6. Fastener driving apparatus as set forth in claim 5, wherein the coupling means comprises means spring-urged into coupling position.

7. Fastener driving apparatus as set forth in claim 5 wherein the coupling means includes a pair of cam members and resilient means urging said cam members into engagement, said cam members camming out of engagement against said resilient means upon application of said predetermined arresting force.

8. Fastener driving apparatus as set forth in claim 7 and further including retractive means operable between said fastener driver member and said supporting means for retracting said supporting means to fastener receiving position upon movement of said driver member to retracted position.

9. Fastener driving apparatus comprising a fastener driving member operable between a retracted and an advanced position, means for supporting a fastener in alignment with said driver member, and spaced therefrom with said driver member in retracted position, said supporting means being movable from a fastener receiving to a fastener discharging position, means including an escapement mechanism for supplying fasteners in succession to said supporting means in fastener receiving position, means for advancing said driver member relative to said supporting means to bring said driver member into engagement with a fastener carried by said supporting means, coupling means for thereafter advancing said driver member and said supporting means as a unit, means for arresting said supporting means in fastener discharging position, means for discharging said fastener from said supporting means with said supporting means in said discharging position, means for further advancing said driver member beyond said supporting means to drive said fastener into a workpiece, means for moving said fastener driving member back to retracted position, means for retracting said supporting means to fastener receiving position, and common means mounted for movement with said driver member for controlling said escapement mechanism, said coupling means, and said retracting means for said supporting means.

10. Fastener driving apparatus as set forth in claim 9 wherein the common means comprises a collar having a laterally extending arm thereon for controlling the escapement mechanism, said retracting means being mounted on said collar, and the means for advancing the driver member and supporting means as a unit comprises a member pivotally mounted on the collar and resiliently urged into advancing position.

11. Coupling mechanism for effecting limited advance of a fastener support device with a fastener driver device in a fastener driving apparatus or the like and comprising a ring, means for mounting said ring on said fastener driver device, a finger pivotally mounted on said ring and extending generally axially thereof, and spring means carried by said ring for urging said finger radially inwardly toward the axis of said ring for pushing against the fastener support device to be advanced.

12. A coupling mechanism as set forth in claim 11 wherein the spring-urged finger is provided with a cam tip for effecting disengagement from the fastener support device when the fastener support device presents a predetermined resistance to further advance.

13. A coupling mechanism as set forth in claim 11 and further including a retracting device mounted on said ring and extending generally axially therefrom, said retracting device having a radially inwardly directed part adapted for engagement with the advanced fastener support device for retracting the same.

14. A coupling device for a fastener driver or the like comprising a split ring, means extending across the split for clamping said ring about a moving part, a finger pivotally mounted on said ring and having a cam tip engageable with a part to be advanced, said finger extending generally axially of said ring, spring means urging said finger radially inwardly of said ring and permitting camming of said finger from said part to be advanced when said part to be advanced meets with a predetermined resistance to further advance, a retractor mounted on said ring, said retractor extending generally axially in the same direction as said finger and having a radially inwardly extending tip engageable with the advanced part for retracting the same, said ring having a laterally extending arm adapted for cooperation with an escapement mechanism or the like, and said ring further having means providing a positive stop limiting movement thereof in a given direction.

15. Fastener driving apparatus comprising a fastener driver member operable between a retracted and an advanced position, means for moving said fastener driver member from retracted to advanced position including pressure chamber means, a manually operable control member, and means operated by said control member for applying fluid under pressure to said pressure chamber means at a pressure proportional to the movement of said manually operable member whereby to effect a controlled advance of said fastener driver member.

16. Fastener driving apparatus as set forth in claim 15 wherein the means for supplying fluid under pressure comprises a gas pressure regulator, said regulator including the usual diaphragm and spring means bearing on said diaphragm, and further including a pin for applying pressure to said spring means, and means for mounting said pin in said regulator for longitudinal movement, said pin being engaged by said manually operable member for varying the pressure applied to the spring means in accordance with the position of the manually engageable means and the pin whereby to vary the pressure controlled by said regulator.

17. In a regulator of the type having a body with an inlet and an outlet and further having a bonnet, a valve assembly being in said body between said inlet and outlet and a diaphragm being clamped between said bonnet and said body, a lower spring rest on said diaphragm, an upper spring rest spaced from said lower spring rest, and spring means compressed between said spring rests, the combination comprising a bushing extending through said bonnet in axial alignment with said spring means and spring rests, and a pin slidably fitting through said bushing and bearing against the upper spring rest for determining the pressure to be regulated in accordance with the position of the pin.

18. Fastener driving apparatus comprising a fastener driver member operable between a retracted and an advanced position, means for supporting a fastener in alignment with said driver member and spaced therefrom with said driver member in retracted position, means including a feed chute and an escapement mechanism for supplying fasteners to said fastener supporting means, means for thereafter advancing said driver member relative to said supporting means to bring said driver member into engagement with a fastener carried by said supporting means, means for thereafter advancing said driver member and said supporting means as a unit, means for arresting said supporting means, means operable to release said fastener from said supporting means with said supporting means in arrested position, means for further advancing said driver member beyond said supporting means to drive said fastener into a workpiece, and means including a lost motion connection between said driver member and said escapement mechanism for releasing fasteners in timed relation to the movement of said driver member, said escapement mechanism including two members alternately covering said feed chute.

19. Fastener driving apparatus as set forth in claim 18 wherein the escapement mechanism comprises a pair of plates having more or less parallel portions offset from one another generally perpendicular to the plates, said plates being pivotally mounted about a common pivot and being angularly offset, one of said plates being mounted upstream of the other and of relatively small arcuate extent and overlying said chute to block fasteners therein, the other plate being located relatively downstream and being of relatively large arcuate extent and overlying said chute alternatively with the other plate to release fasteners one by one down said chute.

20. Fastener driving apparatus comprising a fastener driving member operable between a retracted and an advanced position, means for supporting a fastener in alignment with said driver member and spaced therefrom with said driver member in retracted position, means including a feed chute for supplying fasteners to said supporting means, a hopper for supplying fasteners to said feed chute, and drive means including a safety clutch for operating said hopper, said clutch including driving and driven members having concentric portions in radial alignment, one of said concentric portions having a spring-pressed roller member engaging the other portion, and said other portion having a seat receiving said roller member.

21. Fastener driving apparatus comprising a fastener driver member operable between a retracted and an advanced position, means for supporting a fastener in alignment with said driver member and spaced therefrom with said driver member in retracted position, means for supplying fasteners to said fastener supporting means, means for advancing said driver member relative to said supporting means to bring said driver member into engagement with a fastener carried by said supporting means, means for thereafter advancing said driver member and said supporting means as a unit, means for arresting said supporting means, means operable upon such arrest to release said fastener from said supporting means, means for further advancing said driver member beyond said supporting means to drive said fastener into a workpiece, and means providing a positive stop limiting such further advancing of said driver member.

References Cited in the file of this patent

UNITED STATES PATENTS

| | | |
|---|---|---|
| 1,774,030 | McLaughlin | Aug. 26, 1930 |
| 2,605,792 | Havener | Aug. 5, 1952 |
| 2,646,091 | Austin | July 21, 1953 |
| 2,664,121 | Travis | Dec. 29, 1953 |

FOREIGN PATENTS

| | | |
|---|---|---|
| 324,992 | Germany | Sept. 9, 1920 |